United States Patent

[11] 3,571,788

[72] Inventors Milo M. Backus;
William A. Schneider, Dallas, Tex.
[21] Appl. No. 860,113
[22] Filed Sept. 22, 1969
[45] Patented Mar. 23, 1971
[73] Assignee Texas Instrument Incorporated
Dallas, Tex.
Continuation of application Ser. No. 714,751, Mar. 20, 1968, now abandoned, which is a continuation of application Ser. No. 550,314, May 16, 1966, now abandoned.

[54] METHOD AND APPARATUS FOR PRODUCING SPACE AVERAGED SEISMIC DATA
24 Claims, 8 Drawing Figs.
[52] U.S. Cl. .................................................. 340/15.5
[51] Int. Cl. .................................................. G01v 1/28
[50] Field of Search .......................................... 340/15.5, (RRC)

[56] References Cited
UNITED STATES PATENTS
3,213,411 10/1965 Loring .......................... 340/15.5
3,216,523 11/1965 Naquin et al. ................. 340/15.5X
3,217,289 11/1965 Elliot et al. .................... 340/15.5
3,217,828 11/1965 Mandenhall et al. .......... 340/15.5X
3,274,541 9/1966 Embree ......................... 340/15.5
3,302,164 1/1967 Waters et al. .................. 340/15.5

OTHER REFERENCES
Mayre, Common Reflection Point Horizontal Data Stacking Techniques, Geophysics, Vol. 27, No. 6, Part II, Dec. 1962 pp 927—38

Primary Examiner—Rodney D. Bennett, Jr.
Assistant Examiner—Daniel C. Kaufman

ABSTRACT: A method and system for producing time- and space-averaged displays of seismic signals from a suite of common depth point seismic records. Primary crosscorrelation signals are generated by selectively crosscorrelating the same limited time gate of a plurality of sets of pairs of traces from all the seismic records. The pairs of traces in each of the sets each include energy thereon which travels to and from subsurface reflecting points over corresponding pairs of paths of first and second geometries, respectively. Primary correlation signals for each of the sets are summed to produce a set of output correlation signals which are displayed on a common correlation scale in the order of increasing space lag.

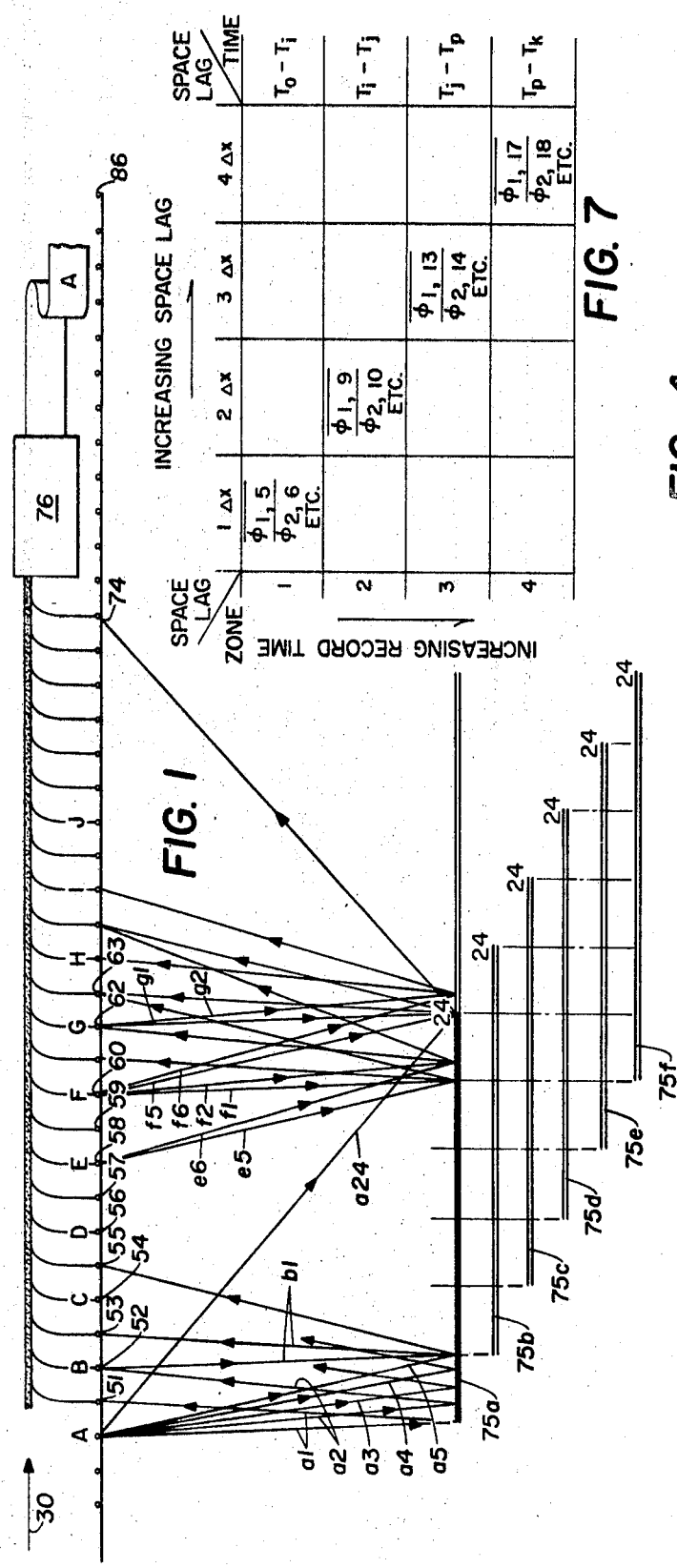
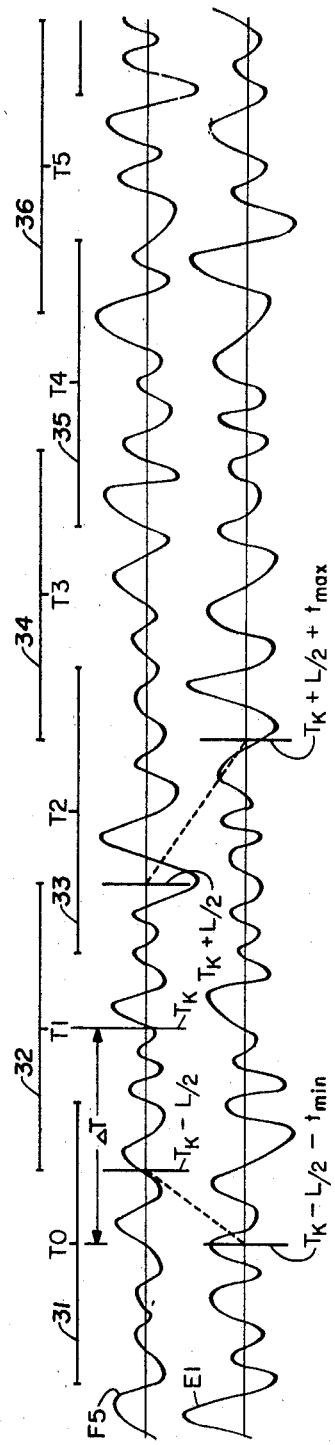
INVENTOR
MILO M. BACKUS
WILLIAM A. SCHNEIDER
ATTORNEY

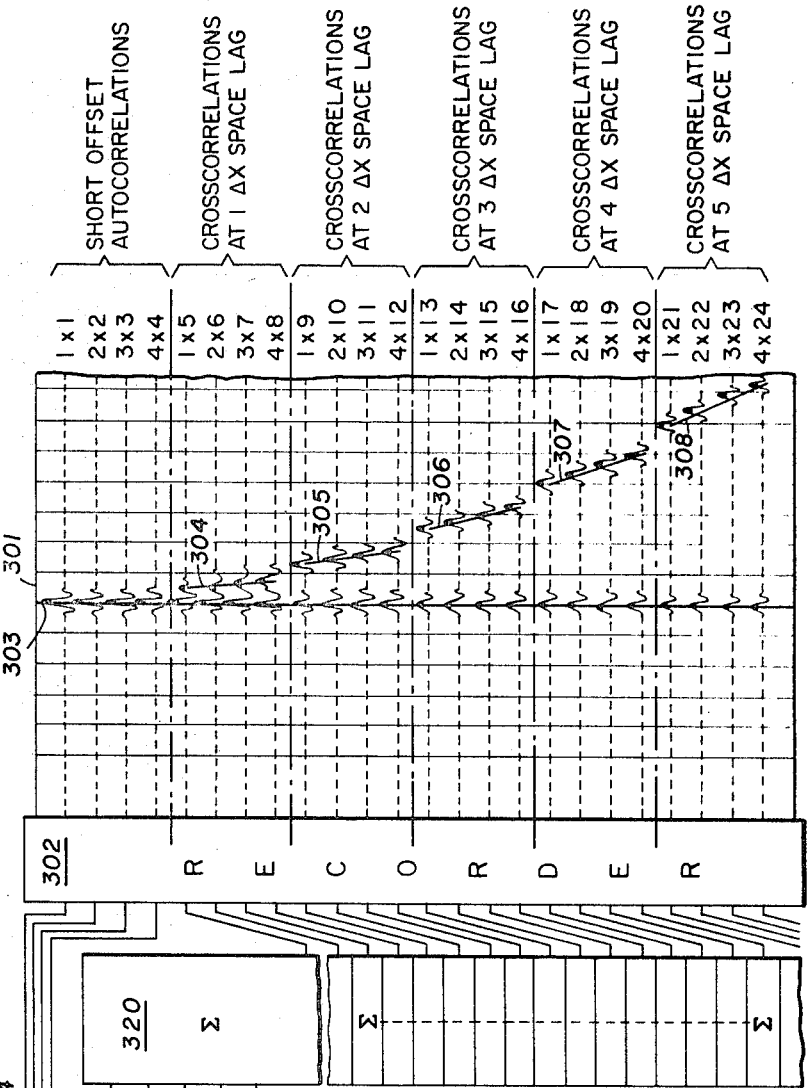
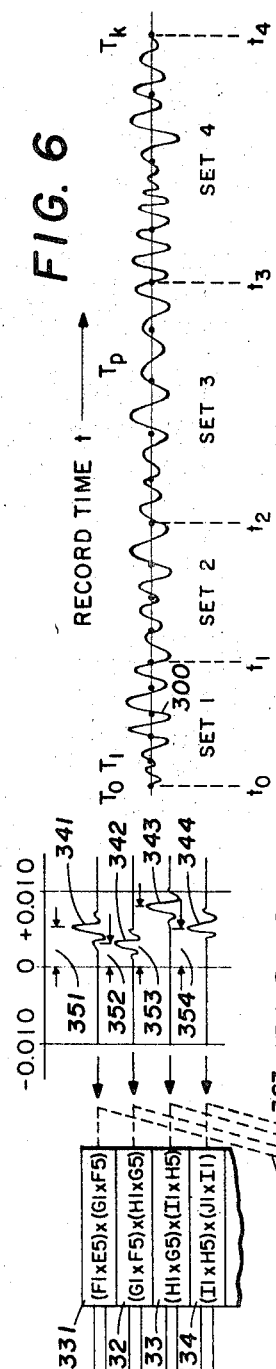
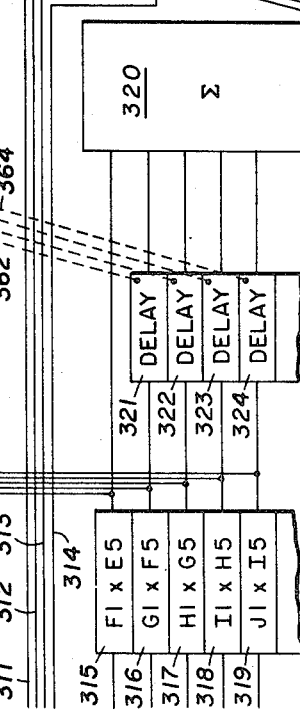

METHOD AND APPARATUS FOR PRODUCING SPACE AVERAGED SEISMIC DATA

This application is a continuation of application Ser. No. 714,751, filed Mar. 20, 1968, now abandoned, which was a continuation of application Ser. No. 550,319, filed May 16, 1966, now abandoned.

This invention relates to the generation and display of signal information from related time series and more particularly, in one aspect, relates to the use of space averaging to obtain a unique dynamic correlation among seismic signals.

The present invention is particularly useful in connection with known common depth point (CDP) seismic exploration methods, such as disclosed in U.S. Pat. No. 2,732,906 to Mayne. It is also useful in enhancement and analysis of seismic traces forming seismic section displays.

Data processing systems are now available which render useful the application of many advanced data processing methods to long-time series, particularly those methods which involve autocorrelation functions and crosscorrelation functions. Such functions have been described, for example, by Norbert Wiener in his publication entitled "Extrapolation, Interpolation, and Smoothing of Stationary Time Series," John Wiley & Sons, Inc. (1950), page 5, Equation 0.424. An example of an application of Wiener's disclosure to seismic data processing is disclosed in U.S. Pat. No. 2,927,656 to Feagin et al.

The present invention will be described first in connection with treatment of CDP seismograms corrected for normal moveout (NMO). As thus employed, the invention relates to generation and use of crosscorrelation functions in a new and unique manner for the analysis of seismograms produced in CDP seismic exploration and more particularly is directed to the production of dynamic correlations for sets of different CDP space lags to permit simple velocity filtering advantageously to be used to separate the various velocity components present in the set of seismic data.

More particularly, in accordance with the invention, limited time gates from each trace in a plurality of sets of common depth point seismic traces are crosscorrelated to produce a family of crosscorrelation functions. The corresponding crosscorrelation functions are stacked to produce an array of time and space-averaged crosscorrelation functions.

In a broad aspect, the invention involves use of at least three seismic traces corrected for normal moveout (NMO). In CDP operations, traces from three CDP records are employed wherein seismic waves are so generated and detected such that all of the three records may include energy reflected from the same subsurface points and where energy reflected from any given one of the subsurface points travels to and from any one point via different paths.

In CDP operations, the invention involves crosscorrelating traces from two of the records wherein the traces include energy reflected from a first subsurface point to produce a first crosscorrelation function. Traces from each of a second pair of the records are crosscorrelated. The latter traces similarly will include energy reflected from a second subsurface point spaced substantially from said first point to produce a second crosscorrelation function.

Traces from the first pair of records are crosscorrelated where the traces include energy reflected from a third point adjacent to the first point to produce a third crosscorrelation function.

Traces from the second pair of records are crosscorrelated where the latter traces include energy reflected from the fourth point adjacent to the second point to produce a fourth crosscorrelation function. Thereafter, the first and second crosscorrelation functions are summed and the third and fourth crosscorrelation functions are summed to produce a pair of stacked output correlation functions. The output functions are then registered relative to the origin of the correlation functions.

For a more complete understanding of the present invention and for further objects and advantages thereof, reference may now be had to the following description taken in conjunction with the accompanying drawings in which:

FIG. 1 illustrates an off-end common depth point seismic surveying operation;

FIG. 4 illustrates selection of time gates for production of the crosscorrelation functions;

FIG. 6 illustrates the division of a seismic trace into different time zones;

FIG. 7 is a chart showing increasing space lag charted against increasing record time for zones of FIG. 6; and FIG. 8 is a display involving a mixture of space lag correlations.

DYNAMIC CORRELATIONS

Figure 2:
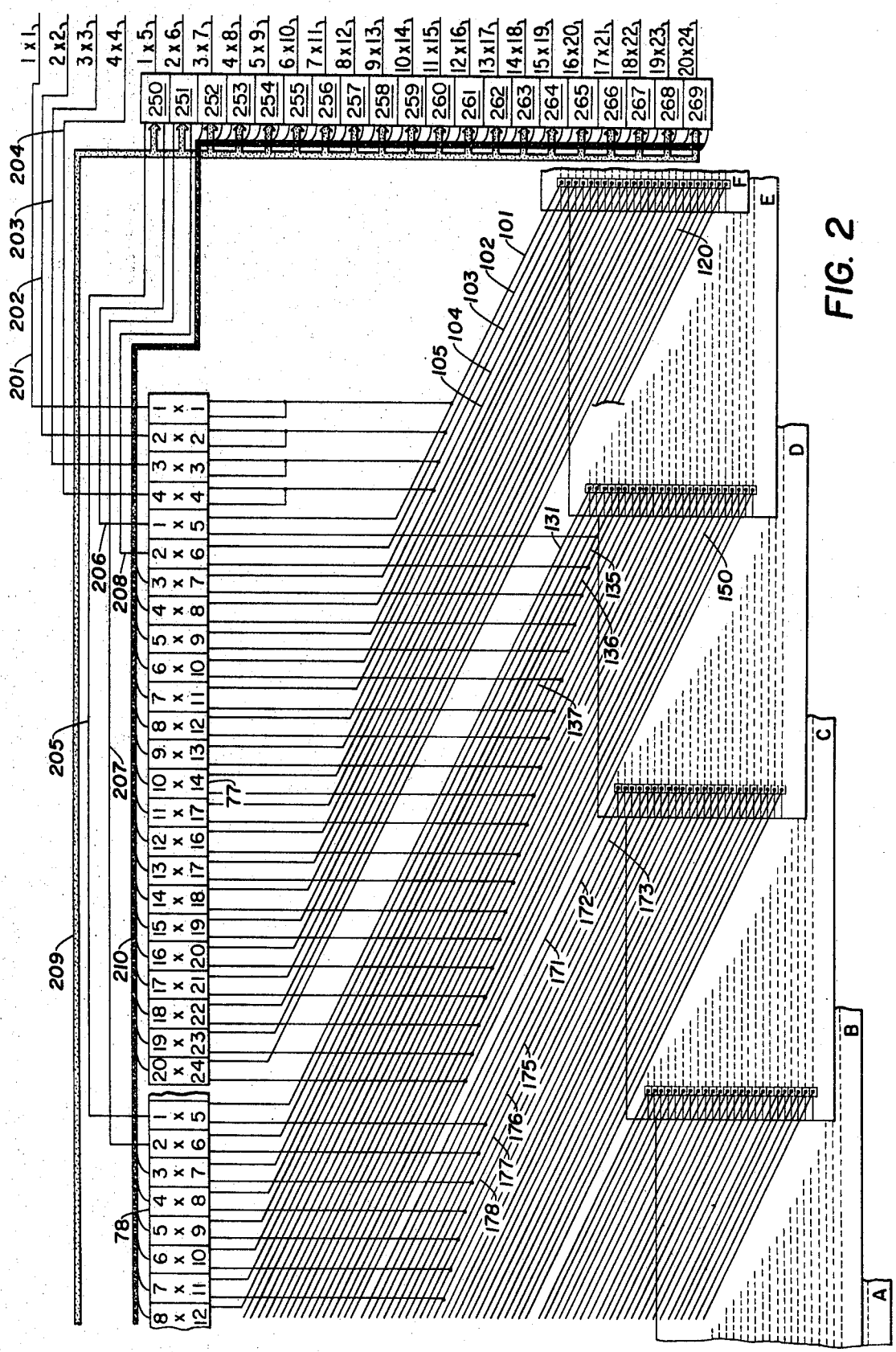
FIG. 2 illustrates a system for producing space- and time-averaged correlation functions from the common depth point signals produced in accordance with FIG. 1.

FIG. 1 illustrates a seismic field operation for common depth point seismic surveying, and more particularly to an off-end shot-spread geometry particularly useful for six-fold subsurface coverage.

Common depth point seismic exploration may be carried out using any one of a number of different surface geometries for the source and detectors. The operation represented by FIG. 1 has been found to be desirable because it permits a continuous multiple coverage of the subsurface. Operations at the surface involve locating shots successively at stations 50, 52,...60, etc. Each shot is located one detector interval from the end detector in the spread. More particularly, seismic waves generated by detonation of an explosive charge at a known depth directly below location 50 would be detected by seismometers located at stations 51—74. The seismometer outputs are recorded by unit 76 to produce a seismogram which is particularly related to the subsurface segment 75a.

Stated otherwise, with the seismometers at locations 51—74, seismic waves created at station 50 travel along ray path $a1$ to and from a subsurface reflection point 1 on the subsurface segment 75a. Seismic waves traveling along the ray path $a24$ are incident upon and reflected from reflection point 24 on subsurface segment 75a. Energy traveling along ray paths $a2$—$a5$ similarly is reflected from subsurface reflection points 2—5, respectively. Thus, the entire subsurface segment 75a is effectively scanned by the sensing of energy reflected from 24 subsurface reflecting points with the energy traveling to the surface stations 51—74.

A 24 trace seismogram A, FIG. 2, is produced. In a similar manner, seismograms B, C, D, E, and F are produced with successive shots being detonated beneath stations 52, 54, 56, 58, and 60.

It will be noted that energy traveling along ray path $b1$ is reflected from the same subsurface point as energy traveling along ray path $a5$. Thus, every fourth subsurface location is characterized by the same geometry. Thus, trace 5 on record A will include energy reflected from the same point as reflected energy appearing on trace 1 of record B, FIG. 2. When the shot location and the spread have been moved along in the direction of arrow 30, such that the shot is at station 60, there will be one trace on each of the records A—F that may include reflections from the same subsurface reflection point. Thus, there is six-fold coverage of the subsurface beginning at the first trace on record F and continuing so long as the program is continued in the direction of arrow 30.

The invention is directed primarily to the utilization of the unique nature of common depth point operations wherein the signals are processed and combined to produce space- and time-averaged signals which lead to an analysis of the subsurface structure with a measure of certainty and accuracy that has not heretofore been possible. Dynamic correlation signals are generated, as between common depth traces. The correlation signals are averaged in the manner hereinafter described to obtain:

a. residual normal moveout vs. time and space, b. residual multiple reflection moveout vs. time and space,
c. ratio of primary to multiple energy vs. time and space,
d. ratio of coherent energy to total energy vs. time and space.

The above are particularly useful in forming optimum space- and time-varying common depth point stacking filters. In addition, that portion of the dynamic correlation which reflects primary energy may be applied as space-time-varying filters to the stacked records to provide the optimum frequency band pass for display and interpretation of the data.

SIMPLIFIED EXAMPLE

To illustrate the mode of operation embodied in this invention, consider the simplified example where only four common depth points and eight traces are involved. More particularly, trace F1 is crosscorrelated with trace E5 and trace G1 is crosscorrelated with trace F5. The resultant crosscorrelation signals or functions are then added or summed to produce a resultant correlation function which, by reason of the addition, is "space averaged." In a similar manner, trace F2 is crosscorrelated with trace E6 and trace G2 is crosscorrelated with trace F6. The resultant crosscorrelation functions are summed to produce a second space averaged correlation function.

The above four-reflection-point example may be further understood by reference to FIG. 1 where the reflection wave paths leading from shot locations E, F, and G to four common depth points are shown in detail. Ray paths $e5$ and $f1$ both lead to and from a first point on the subsurface segment 75a. In a similar manner, ray paths $g1$ and $f5$ both lead to and from a second depth point which is four subsurface stations on down the spread 75a from the first point. Traces including the signals traveling along ray paths $f1$ and $e5$ are crosscorrelated. Similarly, traces including the signals traveling along $g1$ and $f5$ are crosscorrelated. The two resulting crosscorrelation functions are summed and plotted or displayed on a scale having as its zero or origin the zero delay lag in the crosscorrelation scale.

Figure 3:
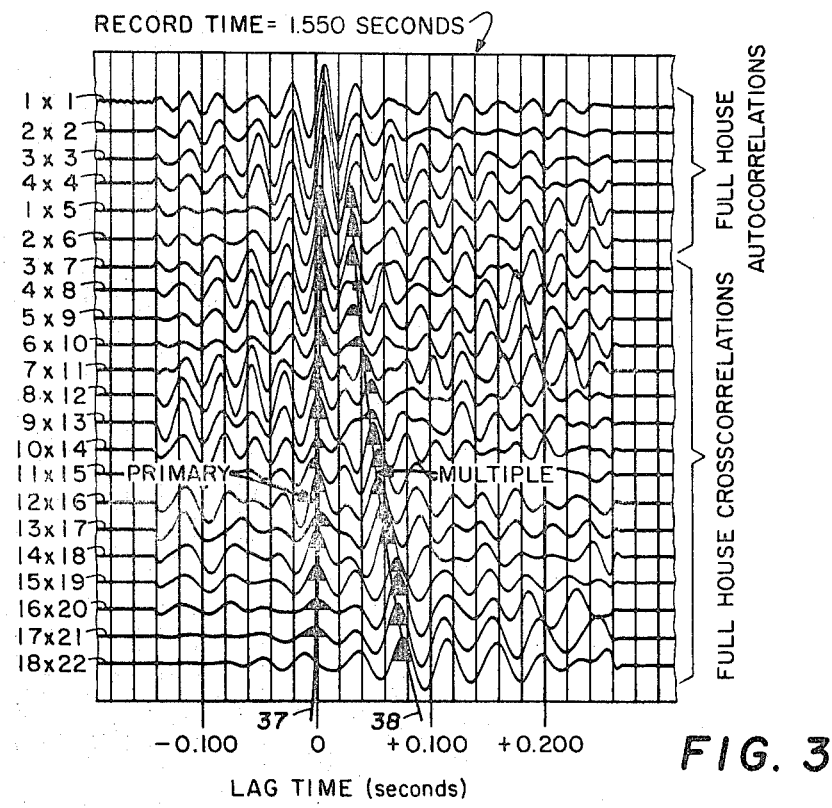
FIG. 3 illustrates the time- and space-averaged crosscorrelations produced in accordance with FIG. 2.

Traces including signals traveling along ray paths $f2$ and $e6$ to and from a third point close to the first point are crosscorrelated. Similarly, traces including signals traveling along ray paths $g2$ and $f6$ to and from a fourth point close to the second point are crosscorrelated. The resultant crosscorrelation functions are then summed and preferably are then plotted or displayed contiguous to the first summed crosscorrelation function with the same zero or origin generally as shown in FIG. 3.

FULL HOUSE OPERATIONS

The description that follows illustrates the extension of the foregoing process to a six-fold coverage seismic operation. In the example that will be described now, a full suite of 24 averaged traces will be produced. In each case, averaging among correlation functions is accomplished by summing the crosscorrelation functions from one spread with crosscorrelation functions from all other spreads. This is done by combining correlation functions derived by crosscorrelating traces which include signals which follow paths of like geometry pairs.

Table I specifies the signals which are crosscorrelated and which resultant correlation functions are summed. In practice, the combinations shown in table I preferably are extended so that about 20 or more space-averaged correlation functions are produced where each such function is the sum of from 20 to 30 or more crosscorrelation functions. A full house set of such functions is represented in FIG. 3 by traces 5—22.

SIX-FOLD COVERAGE EXAMPLE

As noted above with reference to FIG. 1, if the first shot is at station 50, the first full six-fold coverage starts with trace 1 of record F. Record F is produced with a shot located at station 60. Record F is illustrated in FIG. 2 along with records A—E. For such common depth point arrays, the common depth point traces may then be regrouped in accordance with table I.

TABLE I
CDP Trace Grouping

| Input Traces | | Output Depth Points |
|---|---|---|
| A | 21 22 23 24 | |
| B | 17 18 19 20 21 22 23 24 | |
| C | 13 14 15 16 17 18 19 20 21 22 23 24 | |
| D | 9 10 11 12 13 14 15 16 17 18 19 20 21 22 | |
| E | 5 6 7 8 9 10 11 12 13 14 15 16 17 18 | |
| F | 1 2 3 4 5 6 7 8 9 10 11 12 13 14 | |
| G | 1 2 3 4 5 6 7 8 9 10 etc. | |
| H | 1 2 3 4 5 6 | |
| I etc. | 1 2 | |

1×5
2×6
3×7
4×8
5×9
etc.

1 2 3 4 5 6 7 8 9 10 11 12 13 14
Output Depth Points

The grouping of table I is convenient for obtaining dynamic correlations which are to be generated as between the traces within a common depth point set such as traces F1, E5, D9, C13, B17, and A21. The foregoing traces comprise the first full six-fold output traces for the array shown in FIG. 1. In accordance with the invention, it has been found desirable to employ (i) short offset autocorrelations along with (ii) crosscorrelations between short and longer offsets from each common depth point set as will hereinafter be shown.

The signals detected at stations 51—74 of FIG. 1 may be recorded in phonographically reproducible form as, for example, a multichannel digitized magnetic tape recording. This may be carried out in accordance with known methods and by means of known apparatus such as disclosed in U.S. Pat. No. 3,134,957 to Foote et al. For the purpose of the present description, it will be understood that recording and playback systems such as are now well known in the art will be employed for the transfer of data once initially recorded by recorder 76 of FIG. 1, for the operations hereinafter described.

Referring now to FIG. 2, records A—F have been shown in an array which will be recognized as having a direct relationship to the trace grouping of table I. The first record completing a six-fold coverage of a given reflection point along the subsurface segment 75a is the record F. More particularly, record A of FIG. 2 covers the subsurface segment 75a; record B covers subsurface segment 75b; record C, segment 75c; record D, segment 75d; record E, segment 75e; and record F covers subsurface segment 75f.

The records A—F are arrayed in FIG. 2 along with playback heads associated with each record symbolic of simultaneous playback of at least one trace from each of the records required in table I for a given correlation function.

A signal channel leads from a playback head for trace 1, record F, to both inputs of a first correlation unit 1x1 in a set 77 and to one input of unit 1x5 (77). Similarly, channels 102—104 lead to correlation units 2x2—4x4, respectively, and to units 2x6, 3x7, and 4x8 of set 77. Channels 105—120 lead to one input of each of correlation units 9x13—20x24, respectively. Channels 131—150 from the playback unit for record E lead to the second input in the units 1x5—20x24, respectively.

Correlation units 1x1—4x4 and 1x5—20x24 in set 77 and units 1x5—8x12 in set 78 have been shown in block form. Such systems are in general well known both in the analogue and digital form as, for example, described in analogue form in connection with FIG. 4 of U.S. Pat. No. 2,794,965 to Yost, and as further described in U.S. Pat. No. 3,131,375 to Watson. With such understanding, it will now be noted that channel 131 transmits the signal corresponding with trace 1 of record E to one input of a correlation unit 1x5 in the second set 78 of correlation units. Channels 132 and 133 similarly lead to one input of the correlation units 2x6 and 3x7 of set 78. Further, it will be noted that channels 175, 176, and 177 transmit signals from traces 5, 6, and 7 of record D to the second inputs on correlation units 1x5, 2x6, and 3x7, respectively, of set 78. With the foregoing relationships, it will now be seen that autocorrelations from units 1x1, 2x2, 3x3, and 4x4 of set 77 appear on channels 201—204. Two crosscorrelation functions appear on channels 205 and 206, i.e., from units 1x5(77) and 1x5(78). Similarly, two crosscorrelation functions appear on channels 207 and 208, i.e., from units 2x6(77) and 2x6(78).

The crosscorrelation functions on channels 205 and 206 are applied to a summation unit 250 having an output line 251 on which there will appear the 1x5 crosscorrelation summation. The correlation functions on channels 207 and 208 are applied to a summation unit 251 having an output line on which there appears the summation of the 2x6 crosscorrelation functions. Similarly, on the output of the summing unit 252 appears the summation of the 3x7 crosscorrelation functions. The 3x8 summation signal appears at the output of adding unit 253. The signals on channels 201—204 and the outputs of the units 250—269 may then be stored or registered in nonvisible form or they may be recorded as illustrated in FIG. 3.

In FIG. 3, a set of autocorrelation functions and stacked crosscorrelation functions have been plotted. The waveforms plotted are representative of results of processing of actual seismic records. The traces are positioned as to correspond with the output of the system shown in FIG. 2. The output traces include autocorrelation functions 1x1—4x4, respectively. The bottom 18 traces 1x5—18x22 are the stacked crosscorrelation functions for successively increasing shot-detector spacing. It is to be noted that the last two traces corresponding to the last two outputs from FIG. 2 are not included in FIG. 3. Otherwise, the set of output correlation functions as shown in FIG. 3 would correspond with the operations indicated in FIG. 2 with the following understanding. Only two crosscorrelation functions have been described for stacking in FIG. 2, as, for example, in the summing unit 250. In contrast, in actual practice a great many crosscorrelation functions would be stacked to produce the 1x5 trace of FIG. 3. Connections completed by way of cable 209 so indicate. Each of the other stacked crosscorrelation functions similarly are made up of a like number of crosscorrelation functions. In the example illustrated, 24 crosscorrelation functions were stacked to form each of the traces 1x5—18x22.

In FIG. 3 it will be noted that the primary reflection peaks 37 fall substantially uniformly along the zero axis of the crosscorrelation scale. The lag time scale for the correlation display of FIG. 3 is in terms of "seconds lag" employed for the various points on the autocorrelation and crosscorrelation functions.

The legend at the top of FIG. 3 indicates that the crosscorrelation and autocorrelation functions were formed for a time gate centered at RECORD TIME=1.550 SECONDS. This record time may be understood by referring to FIG. 4 wherein it is indicated that traces F5 and E1 are to be crosscorrelated. The record time 1.550 of FIG. 3 may correspond with the center time T1 of the record interval 32. That is, the time gate having a center $T_K$ of trace F5 has limits $T_K-L/2$ to $T_K+L/2$. Time gate 32 from trace F5 is then crosscorrelated with a time gate from trace E1 defined by $(T_K+L/2+t_{max})-(T_K-L/2-t_{min})$.

In the production of the primary crosscorrelation function from unit 1x5(77), FIG. 2, where T1=1.550 seconds, the gate 32, trace F5, would be shifted to the left so that the left extremities of the two gates are in time alignment. The time gate 32 is then shifted progressively towards the right until the right-hand limit corresponds with the limit shown in FIG. 3, i.e., 0.265 second. At each delay interval, one point on the crosscorrelation function is produced. The delay interval $\tau$ employed in obtaining the function shown in FIG. 3 was 0.002 second. Thus, the time gate from trace E1 would be the length gate 32+0.120+0.265 second.

Further, in accordance with the invention, a dynamic correlation display of the type shown in FIG. 3 is produced for each of a plurality of time gates selected at spaced points along the length of the seismograms involved. As indicated in FIG. 4, a first time gate 31 having a center at time T0 is followed by the time gate 32 having a center at time T1. Time gates 33—36, etc. are located at times T2—T5, respectively. A display of the type shown in FIG. 3 is produced for each of the time gates 31—36 so that the character of the earth at successively deeper horizons is accurately depicted by the dynamic correlation display.

In FIG. 4, it will be noted that the time gates 31—36 are selected to have an overlapping relation. This particular relationship is not critical. Rather than overlap, the time gates can be merely contiguous one to another to form a continuous coverage of the entire seismic record time scale. Alternatively, they may be spaced apart so that there is no overlapping or no continuity between the time gates. In actual practice, it has been found desirable, for convenience in processing, to select the time gates such that there is neither overlapping nor space between the time gates.

It will be appreciated that the sets of correlation devices 77, 78, etc. may be eliminated and that, by manual operations, physical representations may be produced and stored to correspond with the autocorrelation and crosscorrelation functions as inputs to the stacking units 250—269. Such stored functions when played back or reproduced and stacked provide for the display of the type shown in FIG. 3.

The display itself may be an oscillographic recording in the form of a wiggle trace record of the type shown in FIG. 3. The display may be of a cathode-ray type presentation of variable area, variable density or wiggle trace. The method is not limited to the particular form of apparatus indicated in FIG. 2 nor to the production of the particular display of FIG. 3. Rather, the operation permits the use of a wide variety of instrumentation. It may involve a fairly simple operation of only three common depth point seismograms with the production of two crosscorrelation signals applied to unit 250 so that only one stacked crosscorrelation trace would be registered, plotted or displayed or otherwise used for analysis. The two-output correlation signal display above described is not as informative as displays of full house correlations such as shown in FIG. 3. In the latter case, the stacked correlation signals will comprise the sum of from 20 to 30 or more crosscorrelation signals.

It is important that the correlation signals employed to produce any one trace on the output display of FIG. 3 involve the sum of correlation functions produced from signals having the same two shot-detector geometries at each of the 20 to 30 different locations along the spread 51—74, FIG. 1. Further, the shot-detector geometries for any one of the stacked crosscorrelation traces of FIG. 3 differ from the geometries of every other one of the stacked crosscorrelation traces. By this means, both time- and space-averaging of the common depth point seismic data is utilized.

One result flowing from the invention is immediately apparent in FIG. 3. FIG. 3 shows that too much normal moveout correction was employed for the primary reflection 37. It is further apparent that there is a strong multiple reflection 38. With such a portrayal of seismic data, the exact correction for normal moveout for the primary 37 can be determined. Further, the nature of the filter necessary to select the primary reflection 37 occurring at record time 1.550 can be specified, as well as the nature of a filter which will eliminate the multiple 38, in accordance with the method disclosed in "Geophysics," Vol. 30, No. 3, Jun. 1965, beginning at page 348.

With such a display for each of a plurality of time gates along the entire seismic record, the precise nature of the operation necessary to best emphasize the desired data and to attenuate undesired or unwanted noise is available throughout the entire record length, as well as along the line from the sub stacks.

Further, in accordance with the present invention, the display of FIG. 3 may be employed as an input signal to a wide band velocity filter process of the type known in the art and described by Embree et al. in "Geophysics," Dec. 1963, pages 948—974. The axis of such filter as applied to the stacked correlation functions of FIG. 3 is rotated so that the nature of the primary and multiple reflections can be precisely identified and separated one from another.

Figure 5:
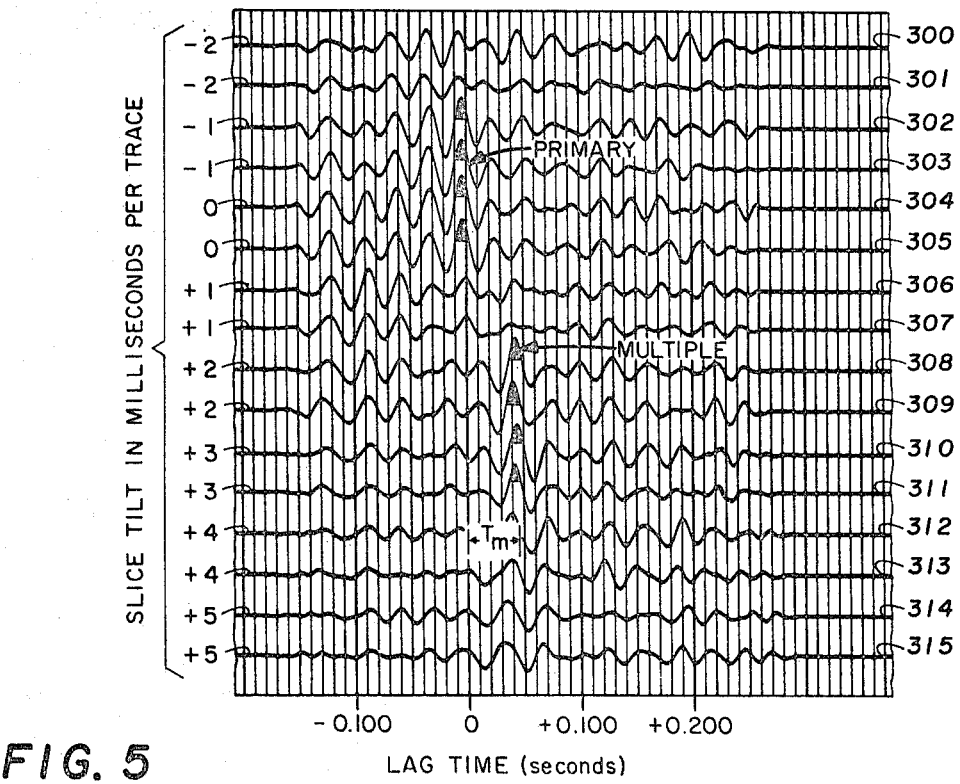
FIG. 5 illustrates results of a rotating wide band velocity filter operation on the signals shown in FIG. 3.

More particularly, FIG. 5 illustrates the results of an alternate trace rotating wide band velocity filter operation on the data of FIG. 3. More particularly, the top trace 400 in FIG. 5 represents the output of filter operation with the traces 1x5, 3x7, 5x9, 7x11, 9x13, 11x15, 13x17, 15x19, and 17x20 of FIG. 3 as the input to the filter and with the filter axis tilted at a rate of −0.002 second per trace. Trace 401 is the filter output on the remaining set of alternate traces of FIG. 3 with the same tilt.

Traces 402 and 403 are filter outputs generally corresponding with traces 400 and 401 built with the filter axis tilted at −0.001 second per trace. Traces 404 and 405 were obtained by operation on the display of FIG. 3 with zero tilt. Traces 406 and 407 were obtained using +0.001 second per trace; traces 408 and 409, +0.002 second per trace; traces 410 and 411, +0.003 second per trace; traces 412 and 413, +0.004 second per trace; and traces 414 and 415, +0.005 second per trace. In each case, the two traces for each tilt are obtained from completely independent data. The reliability of any time indication on the display is thus enhanced when it is found to occur on both traces.

From the relative amplitudes of the energy in the traces in FIG. 5, it will be seen that a primary reflection has a stepout of between zero and −0.001 second per trace. This follows from the fact that the amplitudes of the largest peaks on traces 402-—405 are about equal. This means that the primary 37 properly would be identified as having a stepout of about one-half millisecond per trace in FIG. 3.

When the multiple 38 is considered, it produces the largest amplitude signals on traces 408—411. The multiple is equally developed on traces 408—411. Therefore, the stepout of the multiple as it appears in FIG. 3 is properly identified as about +0.025 second per trace.

FULL HOUSE

As is evident from table I, the geometry of the input traces which make up the various output depth points repeats every fourth output for six-fold coverage. Full house crosscorrelations of FIG. 5 are produced by summing the crosscorrelations of like geometries from many common depth point records. The invention, however, is not limited to a six-fold coverage program.

The repetition of geometry from record to record provides the basis for space-averaging the dynamic correlations for each time gate to improve the data correlation statistically. It assumes that primary reflection and multiple reflection crosscorrelations between CDP pairs for a given time gate are slowly varying functions of space, thus averaging across the seismic traverse or line or part of the line can be performed to build up the primary correlation. Space-averaging for each time gate will be over correlations of "like" geometry; that is, crosscorrelations F1xE5, G1xF5, H1xG5, are stacked to provide an average 1x5 CDP crosscorrelation for part of all of a line.

AUTOMATION

Having described one specific embodiment of the invention, it will be appreciated that the many computations involved suggest the use of digital machines to carry out all or part of the process. The following will specify the automation steps which may be employed.

Referring to FIG. 4 for definitions, $T_K$=center of $k^{th}$ time gate (m.sec.);

L=length of data gate (m.sec.);

$t_{max}$=$p\Delta T$ maximum positive correlation lag (m.sec.);

$t_{min}$=$q\Delta T$ maximum negative correlation lag (m.sec.).

The crosscorrelation between CDP traces $x_i$ and $X_J$ over this time gate is defined by:

$$\phi_{ij}^1(n, k) = \sum_{m\Delta T=T_K-L/2}^{T_K+L/2} X_i(m) X_j(m+n) \qquad (1)$$

for lag range of $-q\Delta T \leq n\Delta T \leq p\Delta T$. The index $k$ refers to the time gate of the correlation, $k = 0, 1,...K$. The maximum number of correlation gates needed per trace ($K$+1) preferably will be of the order of from 25 to 30. In equation (1) the indices $i$ and $j$ refer to trace numbers. The range of $i$ for the particular six-fold geometry under discussion is $i$=1, 2, 3, 4 and it always represents the short offset trace of the CDP set. The range of $j$ is $j$=1+4$s$ where $s$=0,1,2,3,4,5. Thus, for each value of $i$ there are six dynamic correlations consisting of one auto and five crosses each computed for $K$+1 time gates. The subscript $L$ is keyed to the output depth point of table I and ranges in value from $l$=1, 2,...$N$, where $N$ is the last depth point in the line with six-fold coverage. Note that there are 20 depth points at the beginning and end of the line which are less than six-fold coverage. These generally will not be used in dynamic correlation generation. The index $l$ also identifies implicitly which records or shots the traces come from through table I. In computer operations, care is exercised to keep track of all the correlations computed.

DYNAMIC CORRELATION PARAMETER SPECIFICATION

Two modes of operation are suggested as the most desirable. One employs equal gate separation or overlap and the other employs variable gate times.

1. Equal Gate Mode

This will be preferred for it has simpler input. In this mode, the gate centers $T_K$ are equally spaced in time on the record. In use, the first gate center time $T_o$, the number of time gates $K$+1, and the gate center separation $\Delta T$ are specified. This defines the remaining gate center times $T_K=T_o+k\Delta T$ for $k$=1, 2, ...$K$. The gate length L may be automatically computed to give the desired overlap between successive gates. In FIG. 4, a 25 percent overlap has been illustrated, i.e.:

$$L = \frac{4}{3} \Delta T \qquad (2)$$

This yields the interlocking correlation gates as indicated in FIG. 4. Additional input specifications for this operation include: the maximum and minimum correlation lags $t_{max}$, $t_{min}$, data decimation ratio, and the number of depth points $N$ for which the dynamic correlations are to be computed. A record or tabulation of specific trace and record identifications for the CDP groupings will be maintained in each operation for each dynamic correlation.

2. Unequal Gate Mode

This mode will allow the use of a schedule of gate center times $T_k$ which are not equally spaced. Typically, they may be closely spaced at early record times, where signal-to-noise ratios are good and temporal variations occur rapidly. At late record times, coarse spacing will be satisfactory because signal-to-noise ratios are generally poor, because longer data gates needed, and temporal variations in primaries and multiples occur slowly. The gate length $L_k$ may also vary with record time. The 25 percent overlap is described in equation (3):

$$L_k = \frac{4}{3} \Delta T_k = \frac{4}{3} (T_{k+1} - T_k) \qquad (3)$$

where: $k$=0, 1, 2,...$K$−1; and the last gate length equals the preceding one $L_k=L_{k-1}$ Where this overlap is employed, the correlation lag range, data decimation, and number of depth points will be selected and total data length needed from each input trace is given by:
1. For the Equal Gate Mode:
    Initial time=$T_0-L/2-t_{min}$
    Final time=$T_K+L/2+t_{max}$.
2. For the Unequal Gate Mode:
    Initial time=$T_0-L_{0/2}-t_{min}$
    Final time=$T_K+L_{K/2}+t_{max}$.

By way of example, for a line of 305 input profiles, which yields 50 output profiles with full six-fold coverage, the following number of dynamic correlations are computed. Fifty output profiles contain 50×24=1,200 output depth points. For each depth point six dynamic correlations are generated, i.e., one autocorrelation and five crosscorrelations, given a total of:
    Total Dynamic Correlations=1,200×6=7,200.

Each dynamic correlation consists of $K+1$ individual correlations, that is, one for each time gate. Therefore, a grand total of ($K+1$) 7,200 individual correlations are generated and stored for averaging in a variety of ways.

Experience has suggested that 20—30 time gates are sufficient for most problems. Assuming 24=($K+1$), a grand total of individual correlations would be 172,800 per 50-output profile line or 3,456 individual correlations per output profile.

AVERAGING AND DISPLAY OF DYNAMIC CORRELATIONS

Several types of averages may be performed and displayed in several formats with the following key quantitative information:

For space-averaging the dynamic correlations for a given CDP geometry will be averaged over all or part of the line as specified on input. By reference to table I and equation (1), these averages can be described as:

$$\overline{\phi_{ij}}(n, k) = \frac{\Delta T}{L_k Q} \sum_1 \phi_{ij}{}^1(n,k) \quad (4)$$

where the summation 1 is over all output points which contain the particular $i,j$ trace combination, $Q$ is the number of correlations being stacked, and $L_k/\Delta T$ is the number of points in the $k^{th}$ correlation time gate. Normalization by the gate length $L_k/\Delta T$ may be done when computing the dynamic correlations. However, that would require significantly more divisions than by forming one quantity $[(\Delta T)/(L_k N)]$ to be applied to the stacked output. Furthermore, in order to preserve accuracy, the scaling should be done after input to the stacking operation rather than during input to stack.

With space-averaged dynamic correlation functions available, the display may then be selected. It may be of the form shown in FIG. 3 which is a plot or display involving common time gates versus offset. The space-averaged dynamic correlations for display and interpretation illustrated in FIG. 3 shows the correlations for a particular time gate $k$ arranged by offset.

A different display, not shown, may involve common offset versus time gate. This display of the space-averaged dynamic correlations is formed by arranging them in trace form for playback purposes in order of increasing time gate for each offset. There will be 24 such displays, for each portion of the line that is averaged, each one corresponds to a particular $i,j$ combination, where
    $i=1, 2, 3, 4$ and
    $j=i+4s$,    $s=0, 1, 2, 3, 4, 5$.

The first of such displays would comprise the 1x1 correlation summations for each of the time gates 31—36, etc. of FIG. 4. More particularly, in such displays, the top trace would represent the summations of the 1x1 correlations for the time gate 31. The second trace would be the summation of the 1x1 correlations for all records over time gate 32. The third trace would display the 1x1 summation for time gate 33; the fourth trace, the 1x1 summation for time gate 34; the fifth trace, the 1x1 summation for time gate 35; the sixth trace, the 1x1 summation for time gate 36, etc.

The second display would be similar to the first except that it involves the summation of the 2x2 correlations. The third display would be similar to the first except that it involves the summation of the 3x3 correlations. The fourth display would be similar to the first except that it involves the summation of the 4x4 correlations.

The fifth display would involve the summation of the 1x5 correlations. Similar displays are formed through the 2x6, 3x9,...20x24 sequence, such that the 24th display would involve the summation of the 20x24 correlations.

This display is not as readily interpreted as the common time gate versus offset display illustrated in FIG. 3, but represents a useful display of a new and unique set of seismic data.

INCREASING SPACE LAG DISPLAYS

In FIG. 3, the display involves a common time gate versus offset with the space lag being maintained constant. More particularly, the stacked CDP dynamic correlations, as adjacent CDP traces, all have the same $1\Delta X$ space lag, i.e., four group intervals, as indicated in table I.

This particular grouping results in primary and multiple residual moveout which increases linearly when the correlations are displayed in order of increasing mean offset for each time gate. The linear moveout relationships are advantageous for both interpretation and signal processing such as velocity filtering of the displays to quantitatively separate primary and multiple contribution as above described in connection with FIG. 5.

In a display like that of FIG. 3 but for late record times, a $1\Delta X$ (four group intervals) space lag may not provide sufficient resolution of the primary and multiple residual moveout. Therefore, the longer space lags preferably will be employed for increasing record time. The longer space lag dynamic correlations preferably will be displayed with selected short lag correlations while preserving the linear moveout relationships of the set.

For this purpose, it is satisfactory to divide the record into several time zones, four zones being shown along the trace 300 of FIG. 6. For each zone a different set of dynamic correlations will be generated as indicated in the table of FIG. 7.

In FIG. 6, $T_k$ represents the correlation gate limits $k=0, 1,...K$. Record times $t_1$, $t_2$, and $t_3$ define the time zone boundaries. Within each zone a different set of dynamic correlations is generated in the following manner.

Zone 1: For this zone, the displays for all selected time gates will consist of the $1\Delta X$ space lag correlations with no alteration. One such display is shown in FIG. 3. From such a display, residual moveout ($\Delta\Delta\Delta T$) would appear, plotted versus mean offset ($X_i+X_j$) as a straight line passing through the origin. From the slope of such line the correction velocity or residual NMO correction can be determined.

Zone 2: This set of dynamic correlations may consist of $2\Delta X$ space lag corrections plus several $1\Delta X$ lag correlations which provide an extended range of linear moveout versus mean offset.

Zone 3: The third set of dynamic correlations may consist of a mixture of $1\Delta X$, $2\Delta X$, and $3\Delta X$ space lag correlations illustrated in FIG. 8, where the top set of traces are short spacing autocorrelations and sets 2, 3, and 4 are crosscorrelations of successively increasing space lag.

One selection of the time zones of FIG. 6 and the space lags and mixtures thereof for the various time zones is indicated in FIG. 7. Different geophysicists may make different selections than those in FIG. 7. However, in accordance with FIG. 7, during the early record times the displays would involve only the $1\Delta X$ space lags. FIG. 3 is an example of such stacked space-averaged dynamic correlations. The bottom 18 traces represent the $1\Delta X$ or four-group interval crosscorrelations.

FIG. 3 however was taken at a record time of 1.550 seconds. This record time might be within the second zone of FIG. 7. Displays in zone 2 would include 2Δ$X$ space lags. Similarly, in zone 3, 3Δ$X$ space lags would be employed, and in zone 4, 4Δ$X$ space lags would be employed.

In FIG. 8, a display record 301 produced by recorder 302 includes a combination of 1Δ$X$, 2Δ$X$, 3Δ$X$, 4Δ$X$, and 5Δ$X$ crosscorrelations with the top four traces on record 301 being autocorrelation signals.

It will be noted that the greater the space lags employed for producing the crosscorrelation signals, the greater the separation between primary and multiple and the greater the step-out on the multiple.

More particularly, in FIG. 8, the primary 303 has been aligned across the entire record. In the 1Δ$X$ portion of the display, the step-out represented by line 304 for the multiple is not as readily defined as the line 305 which involves the 2Δ$X$ correlations. The definition and separation of the multiple as indicated by the lines 306, 307, and 308 for the 3Δ$X$, and 4Δ$X$, and 5Δ$X$ portions, respectively, of the display illustrates the advantages that may be obtained by employing a combination of space lags in a given display. In any case, the use of larger space lags is desirable for time gates taken at late record times.

In FIG. 8 channels 311—314 apply the four autocorrelation functions to the recorder 302. Units 315—319 and companion units (not shown) may be employed to generate and/or store the crosscorrelation functions for the 1Δ$X$ space lags. The signal from unit 315 is applied directly to the summing unit 320. The signals from units 316—319 are applied to the summing unit 320 by way of delay units 321—324.

The delay units may be set for zero delay for the production of usable displays. The delay units 321—324 and companion delay units in other channels may be advantageously employed to enhance the quality of the display by removing static correction error prior to production of the summation of all the crosscorrelation signals for a given space lag.

STATIC CORRECTION ERROR

The presence of both shot and group static correction errors will degrade the dynamic correlation stack. Static correction as employed herein refers to corrections involving shifting one trace as a whole relative to the other by a constant amount. Shot static correction requires shifting one trace relative to another in dependence upon the difference between elevations of the respective shots employed for producing the two records. Group static corrections involve a similar shift to correct for differences in the elevation of the seismic detector or group of detectors employed for producing the respective traces involved.

In contrast, normal moveout (NMO) earlier discussed refers to corrections introduced into a seismic record by nonlinearly time shifting events on a given seismic trace to compensate for differences between the length of the travel paths from a point source to reflection points on a subsurface horizon and back to the earth's surface and a vertical path. NMO is generally understood in the art. Both analogue and digital systems are known for carrying out such corrections. One system for accomplishing such correction is disclosed in U.S. Pat. No. 3,092,805 to Koeijmans. Residual normal moveout (RNMO) is the moveout still present after application of procedures such as taught by the Koeijmans' patent.

The magnitude of static errors which can be tolerated in the stack will generally depend upon the signal to side lobe level of the individual correlations. In order to insure that the dynamic correlation averages provide adequate estimates of the residual normal moveout (RNMO) and primary versus multiple strength and time dependence, an automatic static correction operation is desired to insure that the dynamic correlations are added in phase. For this purpose, correlation between primary dynamic correlation records is performed, prior to stacking, to obtain the necessary static corrections. More particularly, the static correction to be applied to dynamic correlations F1xE5=$\Phi_{1,15}(n,k)$ and G1xF5=$\Phi_{1,15}(n,$ $k)$ before stacking may be obtained by correlating $\Phi_{1,15}$ and $\Phi_{1,55}$ for plus and minus five correlation lags of 0.002 second each or ±20 m.sec. The time lag for the largest positive peak in this correlation lag range will be the static correction and will be applied to G1xF5 before adding to F1xE5. The next primary correlation signal in this set is H1xG5 (table 1). It will be correlated with G1xF5, and the static correction added to the previous one to get the net static correction relative to F1xE5. This is continued for the entire set of dynamic correlations contributing to the 1x5 geometry, and similarly for the other geometries, 1x9, 1x13, etc. If the individual dynamic correlations $\Phi ilj(n,k)$ are in reproducible record form, these static correlations may be performed as record correlations during the stacking operation. These short secondary correlations may be displayed in trace form for review by the geophysicist to assess the magnitude of the static problem prior to stacking the CDP data. One logical organization of these static correlations is the following. Reference to table I shows that record correlations $\Phi_{1,15} \times \Phi_{1,55}$, $\Phi_{2,26} \times AB_{2,66}$, $\Phi_{3,37} \times_{3,77}$, and $\Phi_{4,48} \times \Phi_{4,88}$ all involve the same three shots E, F, and G. Thus, if only shot or record static correction errors are present, the above four secondary correlation signals will show the same static shift. Therefore, by displaying them as adjacent traces, they can easily be examined for consistency. If group statics are also present, then the statics should not show consistency between the above sets.

Secondary static correlation signals for the entire line may be conveniently displayed as one record with the grouping previously described. Each row or trace in such display gives the successive static correlations between nearest neighbor dynamic correlation with a given offset geometry. The relative static correction between neighbors $l=p$ and $l=p+4$ is read from the positive maximum of correlation indexed $l=p$. The net static correction applied to a given dynamic correlation signal, in the average, is the sum of statics in a given trace up to and including the one in question. In other words, the static corrections for averaging are referenced to the first primary correlation signal in the set. Each successive set of four primary correlation signals (vertically across the record) involves the same input records. They will show the same static error if only record statics are present.

Static corrections determined in the above manner from secondary correlation signals as between primary correlations do not yield directly shot correction or group static corrections to apply to the CDP data. The former are linear combinations of both shot and group statics, but represent an underdetermined system of equations and cannot be solved for shot or group statics without additional independent data. Their value is nonetheless two-fold: (a) they provide the correct statics to align the dynamic correlations before averaging, and (b) they assist in assessing the magnitude of the static problem before CDP stack. If static errors are significant, then the normal procedures can be used to estimate and incorporate static corrections in the CDP stack. Since the static errors determined from the secondary correlation signals will be combinations of shot and group statics, they will serve as a useful check on statics determined independently.

In FIG. 8, it will be noted that the primary crosscorrelation signal F1xE5 from unit 315 and the G1xF5 signal from unit 316 are applied as inputs to the crosscorrelation unit 331. The secondary crosscorrelation signal 341 appears at the output of the unit 331. The time interval 351 represents the static correction necessary properly to align the primary crosscorrelation signal F1xE5 with the primary correlation signal G1xF5. By the linkage 361, the delay in unit 321 is adjusted in proportion to the interval 351. Units 332—334 are employed for production of correlation signals 342—344. Linkages 362-—364 are employed for adjusting the delay in units 322—324, respectively. The adjustment produced by way of linkage 362 will be the sum of delay intervals 351 and 352. The delay introduced by linkage 363 will be the sum of the intervals 351, 352, and 353. The delay introduced by linkage 364 will be the sum of the intervals 351, 352, 353, and 354.

With the primary correlation signals G1xF5, H1xG5, I1xH5, and J1xI5 thus shifted, they are then applied to the summation unit 320 along with the rest of the 1ΔX primary correlation signals similarly corrected for statics to produce the signal on the 1x5 trace of the display record 301. In a similar manner, the primary correlation signals, employed to produce the $2_\overline{\Lambda} X$, 3ΔX, 4ΔX, and 5ΔX traces, may be corrected for statics as above described.

The example used in connection with the foregoing description involves the use of an off-end CDP seismic field procedure. The display of FIG. 3 involves full house correlations for six-fold coverage. Other combinations may be employed. Further, the field procedure need not be limited to the off-end shooting technique. Other selections, for example, four-fold subsurface coverage, 20-fold subsurface coverage, etc., have been found to be useful.

The method and system above described produce time- and space-averaged displays of seismic signals from a suite of common depth point seismic records. The operations may be summarized or characterized as follows. Primary crosscorrelation signals are generated by selectively crosscorrelating the same limited time gate of a plurality of sets of pairs of traces from all the records. The pairs of traces in each of the sets each include energy thereon which travels to and from subsurface reflecting points over corresponding pairs of paths of first and second geometries, respectively. The first and second geometries for any one set differ from the first and second geometries of any other set by different space lags. By this means, a corresponding number of sets of primary correlation signals are produced, differing one from the other in accordance with the space lags. The primary correlation signals for each of the sets are summed to produce a set of output correlation signals. A display is formed of the output correlation signals on a common correlation scale in the order of increasing space lag.

Preferably, a plurality of time gates are selected along the time scale of the seismic records to produce one display for each of a plurality of successively later record times to delineate reflections from successively deeper reflection horizons.

When a time gate from an early record time is employed, the geometries are characterized by small shot-detector spacing differences. When a time gate from a late record time is employed, the geometries are characterized by large shot-detector spacing differences. In one aspect of the invention, when the output correlation signals are ordered in the display in the order of increasing space lag, they are progressively filtered by a rotating wide band velocity filter to produce a set of velocity filtered traces for identification of primary and multiple reflections on each display. In some cases, static corrections may require crosscorrelating the primary crosscorrelation signals in each set in pairs to produce a suite of secondary crosscorrelation signals. The primary crosscorrelation signals are then shifted in time one relative to the other in amounts proportional to the time lags of the maximum peaks on the secondary crosscorrelation signals prior to summing of the primary crosscorrelation signals for eliminating degradation due to static errors.

While ordinarily a great many primary crosscorrelation signals will be combined for each space lag, a minimal operation would involve crosscorrelating limited time gates of a first pair of traces taken from a first pair of seismic records where the traces include energy traveling along paths of first and second geometries, respectively, for reflection from a first reflection point to produce a first crosscorrelation signal. In addition, the same time gates of a second pair of traces taken from a second pair of the seismic records are crosscorrelated where the traces include energy traveling along paths of first and second geometries, respectively, for reflection from a second reflection point spaced from the first point to produce a second crosscorrelation signal. The first and second crosscorrelation signals are then summed to produce an output correlation signal uniquely definitive of primary and multiple content of the three records within the selected time gate.

SIGNAL ENHANCEMENT AND/OR INTERPRETATION OF SEISMIC SECTIONS

Seismic record sections resulting either from common depth point operations as above described or from continuous or skip-continuous seismic field operations often are characterized by low energy seismic signals at or below the threshold at which the coherent data can be distinguished from noise. This condition can occur in early record times but generally is characteristic of late record times. The present invention may be applied to the enhancement of weak seismic signals and/or to the analysis of data in seismic record sections for an accurate evaluation of the dip of the subsurface reflecting horizon. The following description relates to space-averaging seismic data obtained in continuous profiling.

Continuous seismic profiling operations for the production of seismic record sections generally are well known. One such section is illustrated in FIG. 2 of U.S. Pat. No. 3,105,220 to Groenendyke.

In terms of FIG. 1, in continuous profiling, a first 24 trace record would be produced by detonating a charge at shot-point A and detecting the resultant seismic waves at detecting stations 51—74. A second record would be produced by detonating an explosive charge at shot-point G and detecting the resultant seismic waves at detecting locations 63—86. The last trace on the first record includes energy reflected from the same subsurface reflecting point as the first trace on the second record. Thus, the term "continuous profiling." Such an operation is then extended in the direction of arrow 30 to provide such continuous coverage of the subsurface reflecting horizon.

Where such seismic data is available in either reproducible or analogue form, the present invention may be employed as follows. Signals detected at stations 51 and 52 after correction for normal moveout are crosscorrelated. Similarly, signals from stations 52 and 53 are crosscorrelated. In a similar manner, crosscorrelations are produced for each pair of traces over a length of the traverse which may be selected. For example, the last correlation between signals produced by a shot at shot-point A may be selected to be produced between traces detected at stations 62 and 63. The resulting set of 12 correlation functions would then be summed to provide space-averaging over one-half the subsurface segment 75a.

A similar set of crosscorrelation functions would then be produced beginning with the signals detected at station 63 and ending with the signals detected at station 74. The second set of 12 crosscorrelation functions thus produced are then summed to provide a second space-averaged crosscorrelation signal.

Similar space-averaged crosscorrelation signals are produced for succeeding segments of the subsurface reflecting horizon. The resulting family of space-averaged crosscorrelation functions preferably are then displayed in the same general manner as the space-averaged display of FIG. 3.

The crosscorrelations involved are taken for the same selected time gate in each pair of traces. As above described, such gates generally will be during the late record times where signal enhancement is desired or where the attitude of the subsurface reflecting horizon cannot readily be discerned.

The spatial redundancy in either the common depth point seismograms or the continuous seismic profiling is such that where a reflecting plane is dipping at an angle, it will exhibit a time lag in the space-averaged crosscorrelation display. Such a time lag increases with the space lag in a linear fashion. This means that a dipping primary reflection, otherwise buried in noise in a seismic record section, may be made to appear with prominence such as characterizes the PRIMARY reflection of FIG. 3. If the subsurface reflecting horizon is horizontal, then the PRIMARY will line up, without stepout, across the space-averaged display. If the subsurface reflecting horizon dips then the extent of the dip will be indicated on the display. The display is such that the wide band velocity filter can also be applied to automatically pick the dip of the subsurface reflecting horizon. In such case, a set of data of the class shown in FIG. 5 will be produced.

In this aspect of the invention, as well as in the CDP operation first described, a space-averaged display may be produced for each of a plurality of time gates. Further, for any one time gate, it will be useful to produce space-averaged displays for different space lags. More particularly, the example just described involves crosscorrelations between traces having space lags of one unit, that is, the unit distance between detecting stations 51 and 52. A second display would be produced for the same time gate by crosscorrelating trace 51 with 53, 52 with 54, 53 with 55, etc., wherein the space lag is of two units. A third display would involve crosscorrelating trace 51 with 54, 52 with 55, 53 with 56, etc., for a display based on a three-unit space lag. This sequence can be carried forward to the extent necessary to achieve clear identification of the nature of the subsurface reflecting horizon. A dipping bed will be reflected by progressively increasing time lags across the display with increasing space lags between the correlations. Thus, the space-averaging of seismic record sections has at least two desirable results. One is signal enhancement. The other is dip analysis.

The method thus applied is for structural interpretation of the subsurface by means of application of space-average dynamic crosscorrelations to either CDP or continuous profiling traces. This application is particularly valuable for overcoming noise and/or unraveling interference between reflection events from different sets of subsurface reflectors.

Having described the invention in connection with certain specific embodiments thereof, it is to be understood that further modifications may now suggest themselves to those skilled in the art and it is intended to cover such modifications as fall within the scope of the appended claims.

We claim:

1. The method of producing a space-averaged seismic data signal from seismic records of energy produced at a sending station which comprises causing an automatically operable machine to perform the steps of:
   a. producing a first crosscorrelation electrical signal by crosscorrelating limited time gate segments of a first pair of electrical seismic traces taken from said records, which traces include signals representing energy traveling along paths of first and second geometries, respectively, for reflection from first and second reflection points;
   b. producing a second crosscorrelation signal by crosscorrelating the corresponding time gate segments of a second pair of electrical seismic traces taken from said records, which traces include signals representing energy traveling along paths of third and fourth geometries, respectively, for reflection from third and fourth reflection points spaced from said first point; and
   c. summing said first and second crosscorrelation signals to produce an output correlation signal.

2. The method according to claim 1 wherein said second and third points are the same.

3. The method according to claim 1 in which said first, second, third and fourth points are at progressively increasing distances from said sending station.

4. The method of producing a space-averaged seismic data signal from seismic records characterized by spatial redundancy which comprises operating an automatic data processing machine to perform the steps of:
   a. producing a first crosscorrelation electrical signal by crosscorrelating limited time gate segments of a first pair of electrical seismic traces, which traces include signals representing energy traveling along paths of first and second geometries which differ to a first degree for reflection from a reflecting horizon;
   b. producing a second crosscorrelation electrical signal by crosscorrelating the corresponding time gate segments of a second pair of electrical seismic traces, which traces include signals representing energy traveling along paths of geometries which differ to said degree for reflection from said reflecting horizon; and
   c. summing said first and second crosscorrelation electrical signals to produce an output correlation electrical signal.

5. The method of producing a space-averaged seismic data signal form at least three common depth point seismic records which comprises causing an automatically operable system to perform the steps of:
   a. producing a first crosscorrelation electrical signal by crosscorrelating limited time gate segments of a first pair of electrical seismic traces taken from a first pair of said records, which traces include signals representing energy traveling along paths of first and second geometries, respectively, for reflection from a first reflection point,
   b. producing a second crosscorrelation electrical signal by crosscorrelating the corresponding time gate segments of a second pair of electrical seismic traces taken from a second pair of said records, which traces include signals representing energy traveling along paths of said first and second geometries, respectively, for reflection from a second reflection point spaced from said first point; and
   c. summing said first and second crosscorrelation electrical signals to produce an output correlation electrical signal.

6. The method set forth in claim 5 wherein said common depth point seismic records number in the order of 20 to 30 and wherein said output correlation signal is produced by summing crosscorrelation electrical signals which link all said records with common depth point reflection energy having traveled to and from reflection points spaced serially along a reflection horizon over paths exclusively of said first and second geometries.

7. The method of claim 5 wherein said crosscorrelation electrical signals are crosscorrelated to produce a secondary crosscorrelation electrical signal and thereafter one of said crosscorrelation electrical signals is time-shifted relative to the other in an amount equal to the lag of the maximum peak in said secondary crosscorrelation signal preparatory to said summing for production of said output correlation signal.

8. The method of producing spaced-averaged seismic data signals from at least three common depth point seismic records which comprises causing an automatically operable system to perform the steps of:
   a. producing a first crosscorrelation electrical signal by crosscorrelating limited time gate segments of a first pair of electrical seismic traces taken from a first pair of said records, which traces include signals representing energy traveling along paths of first and second geometries, respectively, for reflection form a first reflection point;
   b. producing a second crosscorrelation electrical signal by crosscorrelating corresponding time gate segments of a second pair of electrical seismic traces taken from a second pari of said records, which traces include signals representing energy traveling along paths of said first and second geometries, respectively, for reflection from a second reflection point spaced from said first point;
   c. producing a third crosscorrelation electrical signal by crosscorrelating corresponding time gate segments of a second pair of electrical seismic traces taken from said first pair of said records, which traces include signals representing energy traveling along paths of third and fourth geometries, respectively, for reflection form a third reflection point adjacent to said first reflection point;
   d. producing a fourth crosscorrelation electrical signal by crosscorrelating corresponding time gate segments on a fourth pair of electrical seismic traces taken from said second pair of said records, which traces include signals representing energy traveling along paths of said third and fourth geometries, respectively, for reflection from a fourth reflection point adjacent to said second point;
   e. summing said first and second crosscorrelation electrical signals and summing said third and fourth crosscorrelation electrical signals; and
   f. storing said summed correlation electrical signals for display relative to the same correlation scale.

9. The method set forth in claim 8 wherein said summed correlation signals are displayed as a visual side by side trace display with a common origin on said correlation scale.

10. The method of producing a time- and space-averaged display of seismic signals from a suite of common depth point seismic records which comprises causing an automatically operable system to perform the steps of:
   a. producing primary crosscorrelation electrical signals by selectively crosscorrelating the corresponding limited time gate segments of a plurality of sets of pairs of electrical seismic traces from all of a suite of records wherein the pairs of traces in each of said sets each includes signals representing energy thereon which travels to and from subsurface reflecting points over corresponding pairs of paths of first and second geometries, respectively, and wherein said first and second geometries for any one set differ from the first and second geometries of any other set by different space lags to provide a corresponding number of sets of primary correlation electrical signals which differ one from the other in accordance with said space lags;
   b. summing said primary correlation electrical signals for each of said sets to produce a set of output correlation electrical signals; and
   c. producing a display of said output correlation signals on a common correlation scale in the order of increasing space lag.

11. The method set forth in claim 10 wherein a plurality of time gates are selected along the time scale of said seismic records to produce a like plurality of displays representing reflection points on successively deeper reflection horizons.

12. The method set forth in claim 10 wherein said time gate is at an early record time and said geometries are characterized by small shot-detector spacing differences.

13. The method set forth in claim 10 wherein said time gate is at a late record time and said geometries are characterized by large shot-detector spacing differences.

14. The method set forth in claim 10 wherein the output correlation signals arranged in the display in the order of increasing space lag are progressively filtered by a rotating wide band velocity filter to produce a set of velocity-filtered traces for identification of primary and multiple reflections on the display of said correlation signals which occur at record times within said time gate.

15. The method set forth in claim 10 wherein the primary crosscorrelation signals in each set are crosscorrelated in pairs to produce a suite of secondary correlation signals and wherein said primary crosscorrelation signals are shifted in time one relative to the other in amounts proportional to the time lags of the maximum peaks on said secondary crosscorrelation signals prior to summing said primary crosscorrelation signals for production of said set of output correlation signals.

16. The method set forth in claim 10 wherein a plurality of time gates are selected along the time scale of said seismic records to produce a like plurality of displays representing reflection points on successively deeper reflection horizons.

17. The method set forth in claim 10 wherein said time gate is at an early record time and said geometries are characterized by small shot-detector spacing differences.

18. The method set forth in claim 10 wherein said time gate is at a late record time and said geometries are characterized by large shot-detector spacing differences.

19. The method set forth in claim 10 wherein the output correlation signals arranged in the display in the order of increasing space lag are progressively filtered by a rotating wide band velocity filter to produce a set of velocity filtered traces for identification of primary and multiple reflections on the display of said correlation signals which occur at record times within said time gate.

20. The method set forth in claim 10 wherein the primary crosscorrelation signals in each set are crosscorrelated in pairs to produce a suite of secondary crosscorrelation signals and wherein said primary crosscorrelation signals are shifted in time one relative to the other in amounts proportional to the time lags of the maximum peaks on said secondary crosscorrelation signals prior to summing said primary crosscorrelation signals for production of said set of output correlation signals.

21. A system for producing a space-averaged seismic data signal from at least three common depth point seismic records which comprises:
   a. means for simultaneously reproducing pairs of said records;
   b. means responsive to limited time gates of a first pair of traces taken from a first pair of said records wherein said traces include signals representing energy traveling along paths of first and second geometries, respectively, for reflection from a first reflection point to produce a first primary crosscorrelation signal;
   c. means responsive to the same time gates of a second of said records wherein said traces include signals representing energy traveling along paths of first and signal; geometries, respectively, for reflection from a second reflection point to produce a second primary crosscorrelation signal; and
   d. means to sum said first and second primary crosscorrelation signals to produce an output correlation signal.

22. The combination set forth in claim 21 which includes:
   a. means to crosscorrelate said first and second primary correlation signals to produce a secondary correlation signal; and
   b. means to shift one of said first and second primary crosscorrelation signals relative to the other in proportion to the time lag of the maximum amplitude of said secondary crosscorrelation signal for enhancement of said output correlation signal.

23. A system for producing a space-averaged seismic display from at least three common depth point seismic records, which comprises:
   a. means for simultaneously reproducing pairs of traces from said records;
   b. means responsive to limited time gates of a first pair of traces taken from a first pair of said records wherein said traces includes signals representing energy traveling along paths of first and second geometries, respectively, for reflection from a first reflection point to produce a first primary crosscorrelation signal;
   c. means responsive to the same time gates of a second pair of traces taken from a second pair of said records wherein said traces include signals representing energy traveling along paths of first and second geometries, respectively, for reflection from a second reflection point to produce a second primary crosscorrelation signal;
   d. means responsive to limited time gates of a third pair of traces taken from said first pair of records wherein said third pair of traces includes signals representing energy traveling along paths of third and fourth geometries, respectively, for reflection from a third reflection point adjacent to said first reflection point to produce a third primary crosscorrelation signal;
   e. means responsive to the same time gates of a fourth pair of traces taken from said second pair of records wherein said fourth pair of traces includes signals representing energy traveling along paths of said third and fourth geometries, respectively, for reflection from a fourth reflection point to produce a fourth primary crosscorrelation signal;
   f. means to sum said first and second primary crosscorrelation signals and means to sum said third and fourth primary crosscorrelation signals to produce a pair of output correlation signals; and
   g. means to store said output correlation signals relative to a common correlation scale.

24. The method of producing a space-averaged seismic data signal from seismic records characterized by spatial redundancy which comprises causing an automatically operable system to perform the steps of:

a. producing a first crosscorrelation electrical signal by crosscorrelating limited time gate segments of a first pair of electrical seismic traces, which traces include signals representing energy traveling along paths of first and second geometries which differ to a first degree for reflection from a reflecting horizon;

b. producing a second crosscorrelation electrical signal by crosscorrelating the corresponding time gate segments of a second pair of electrical seismic traces, which traces include signals representing energy traveling along paths of geometries which differ to said degree for reflection from said reflecting horizon; and c. summing said first and second crosscorrelation electrical signals to produce an output correlation electrical signal.